United States Patent [19]

Marrujo et al.

[11] 4,440,441
[45] Apr. 3, 1984

[54] ENERGY ATTENUATING SEAT AND LEG THEREFOR

[75] Inventors: Ralph G. Marrujo; Adrianus A. G. Cooper, both of Winston-Salem, N.C.

[73] Assignee: Fairchild Industries, Inc., Germantown, Md.

[21] Appl. No.: 331,690

[22] Filed: Dec. 17, 1981

[51] Int. Cl.³ .............................................. B60R 21/10
[52] U.S. Cl. ..................................... 297/216; 188/371; 296/65 A; 297/232
[58] Field of Search ............. 188/371, 372; 296/65 A; 297/216, 472, 232; 244/122 R

[56] References Cited

U.S. PATENT DOCUMENTS

| | | | |
|---|---|---|---|
| 3,460,791 | 8/1969 | Judd | 297/216 X |
| 3,531,154 | 9/1970 | Fleche | 297/216 X |
| 3,603,638 | 9/1971 | McGregor et al. | 297/216 |
| 3,724,603 | 4/1973 | Shiomi et al. | 188/371 |
| 3,981,114 | 9/1976 | Chupick | 188/371 X |
| 4,154,472 | 5/1979 | Bryll | 297/216 X |
| 4,349,167 | 9/1982 | Reilly | 188/372 X |

Primary Examiner—James T. McCall
Attorney, Agent, or Firm—Michael W. York

[57] ABSTRACT

An energy attenuating seat and a leg therefor for use in a vehicle. The leg for the seat is configured to allow it to be initially elastically deformed when subjected to a predetermined load. This elastic deformation is achieved by constructing the leg with two spaced apart flange portions. Spacers are located on one of the flange portions which are adapted to contact the other flange portion after a certain amount of elastic deformation has taken place. When the spacers are in contact the leg is capable of withstanding an increased load. However, further loading eventually results in the plastic deformation of the leg. Since the deformable legs are located on the forward portion of the seat, the seat pivots forwardly and downwardly when subjected to excessive loads which lowers the center of gravity of the seat. The elastic and plastic deformation of the leg absorbs energy and helps the seat and its occupants withstand peak loads or shocks resulting from excessive forward loads such as would occur during a vehicle crash. The lowering of the center of gravity also tends to prevent the seat from becoming detached from the vehicle when the seat is subjected to excessive forward loads.

15 Claims, 8 Drawing Figures

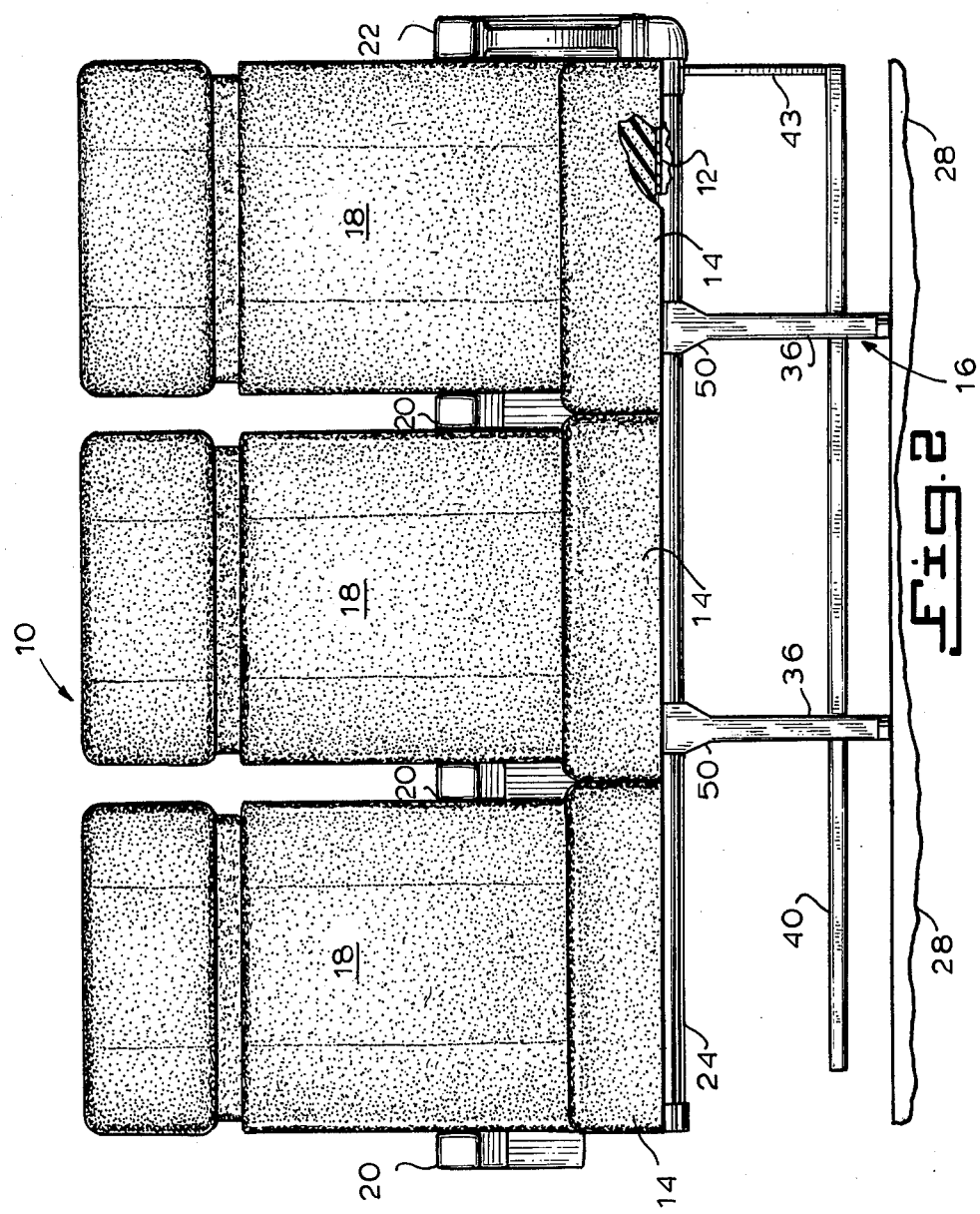
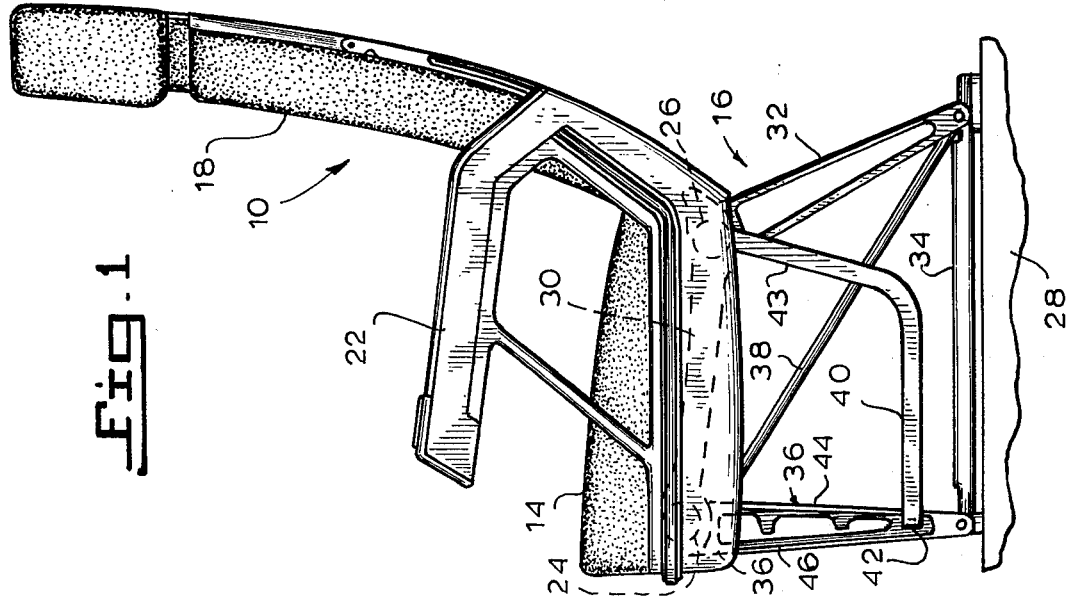

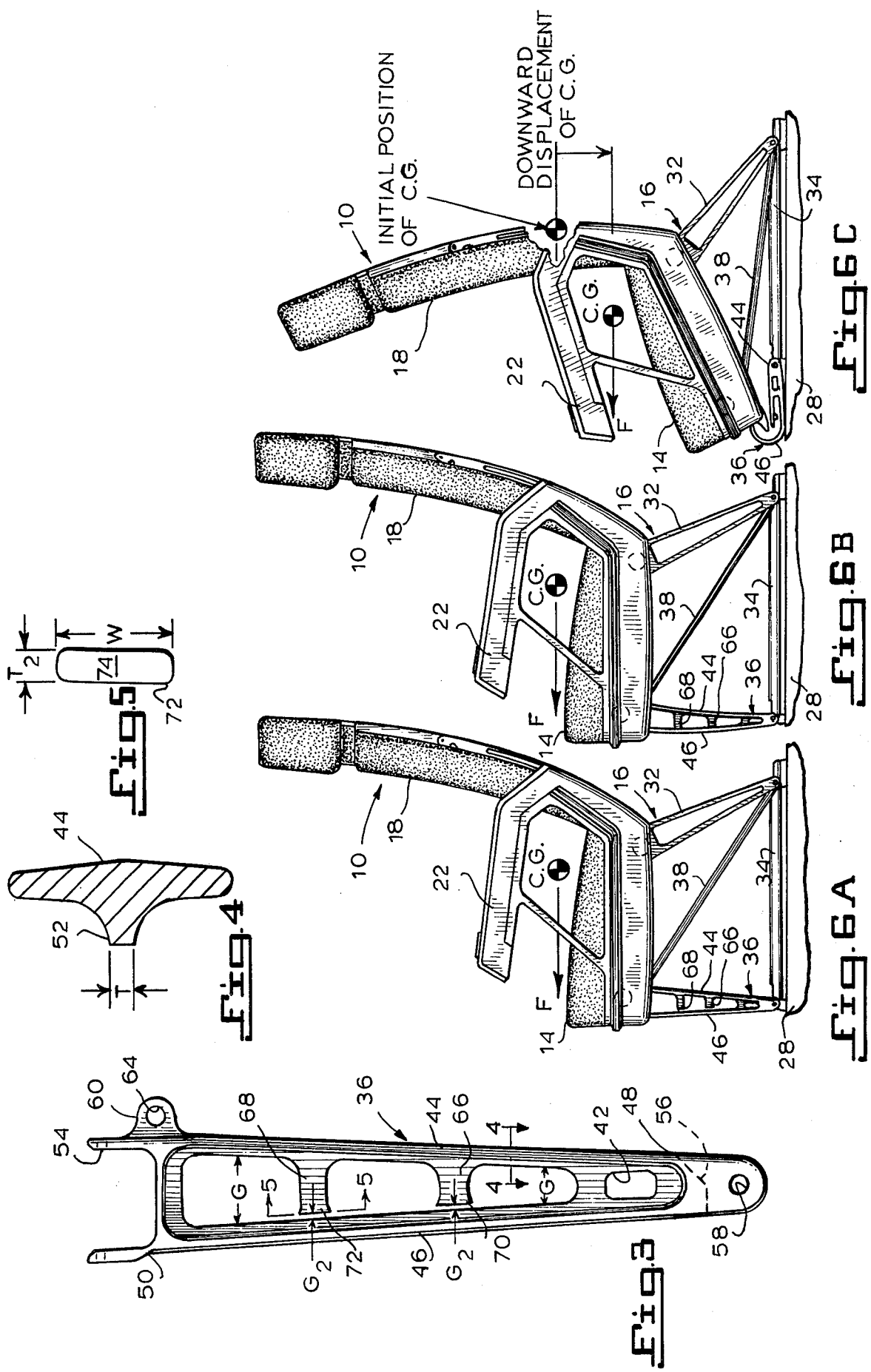

ENERGY ATTENUATING SEAT AND LEG THEREFOR

BACKGROUND OF THE INVENTION

It is important that seats which are to be located within vehicles such as aircraft and the like be suitably designed to resist the forces to which they may be subjected when the vehicle is subject to sudden stops such as would occur in a collision or a crash involving the vehicle. When a vehicle such as an aircraft or the like is subjected to a collision or a crash, the forces exerted on the seats may be extremely high in view of the speed of the vehicle and its rapid deceleration when it is involved in a collision or a crash.

In view of the forces exerted upon the seats when a vehicle such as an aircraft is involved in a collision or a crash, it is very difficult to design a suitable seat which will adequately seat the occupants during such a collision or crash. One particular problem is that the loads exerted upon the seat may be so high as to cause the seat to actually separate from the vehicle. Of course, such a situation is highly undesirable since not only does the separated seat substantially increase the risk of injury to the occupant, but in addition the separated seat can also cause injuries to others since it is detached from the aircraft. The present attaching systems for attaching aircraft seats and the like to the interior of an aircraft generally include some type of locking tracks located in the floor of the aircraft and associated locking mechanisms connected to lower ends of the legs of the aircraft seats which are designed to engage the locking tracks. Unfortunately, this type of system has a definite limit insofar as its strength and ability to survive the forces exerted upon it during a collision or crash.

In view of this situation, it is necessary to design the vehicle seat in a manner such that it will absorb or attenuate some of the energy to which it is subjected during a collision or crash so that this energy is not passed on to the seat attaching system. In particular, it is important that the vehicle seat absorb or attenuate sufficient energy so that the attaching system does not fail in order that the vehicle seat remain connected to the vehicle during a collision or a crash. The importance of providing some means of absorbing or atten-uating the energy to which a seat is subjected during a crash or an abrupt stop has been recognized in the past and some seats have been designed incorporating some type of energy absorbing attenuating apparatus. An example of such an apparatus is set forth in U.S. Patent No. 3,059,966 which discloses an aircraft seat which incorporates an energy absorbing brace. Unfortunately, the effectiveness of such a seat is limited since it is designed to only provide energy absorbing means for reducing the shock to a person resulting from downward movement of the aircraft whereas in many collisions and crashes the major concern is with an abrupt halt to forward movement of the vehicle. Moreover, the construction of the seats set forth in this patent did not readily permit it to be utilized in commercial vehicles such as aircraft.

Another example of such an apparatus is set forth in U S. Pat. No. 3,603,638 which discloses a vehicle seat which is designed to absorb energy by having a support member for the seat which is designed to bend when it is subjected to a particular load. Unfortunately, this system also relies upon some type of associated energy absorber or shock absorber unit which are associated with the bendable members. Such an energy absorbing unit may be impractical to utilize in connection with a vehicle seat and in any event would significantly increase the cost of the seat. In addition, the use of such an energy absorbing unit would increase the weight of the seat which is particularly undesirable insofar as aircraft seats are concerned.

The present invention overcomes these problems associated with previous efforts to provide vehicle seats with energy absorbing or attenuating apparatus to enable them to counteract the forces exerted upon the seat during a vehicle collision or crash. In particular, the present invention provides a vehicle seat and leg therefor which is capable of readily absorbing energy resulting from an abrupt deceleration of the vehicle primarily when the vehicle is moving in forward direction. Moreover, the present invention does not require any complex alterations of the seat and does not increase the weight of the seat. Also, this invention does not require any significant redesign of the basic seat and under suitable circumstances existing seats can be modified or retrofitted to incorporate the invention.

SUMMARY OF THE INVENTION

This invention relates to vehicle seats and more particularly to a vehicle seat and leg therefor which can absorb energy.

Accordingly, it is a primary object of the present invention to provide an energy attenuating seat and leg therefor which can increase the safety of the seat occupants.

It is another object of the present invention to provide an energy attenuating seat and leg therefor which are particularly useful in a vehicle.

It is another object of the present invention to provide an energy attenuating seat and leg therefor for use in a vehicle which reduces the chance of injury to the seat occupants when the vehicle is subjected to a crash or a collision.

It is a further object of the present invention to provide an energy attenuating seat and leg therefor for use within a vehicle which decreases the chance of the seat being detached from the vehicle when the vehicle is subjected to a collision or crash.

It is another object of the present invention to provide an energy attenuating seat and leg therefor for use in a vehicle which is particularly useful for reducing the adverse effects of forward directed forces resulting from a crash or a collision of a vehicle.

It is another object of the present invention to provide an energy attenuating seat and leg therefor which is particularly useful in an aircraft.

It is another object of the present invention to provide an energy attenuating seat and leg therefor which does not require substantial redesign of the seat.

It is another object of the present invention to provide an energy attenuating seat and leg therefor which does not increase the weight of the seat.

It is also an object of the present invention to provide an energy attenuating seat and leg therefor which does not substantially increase the cost of the seat.

It is also an object of the present invention to provide an energy attenuating seat and leg therefor for use in a vehicle which lowers the center of gravity of the seat when the vehicle is subjected to a crash or a collision.

The present invention provides an energy attenuating seat which includes a seat bottom and attached seat back and seat support structure connected to the seat bottom. The seat support structure includes means for a portion therefor to collapse when the seat is subjected to excessive forward loads. The present invention also includes a leg for a seat which has means for absorbing energy when being subjected to excessive loads.

BRIEF DESCRIPTION OF THE DRAWINGS

The invention will be hereinafter more fully described with reference to the accompanying drawings in which:

FIG. 1 is a side elevational view of the energy attenuating seat of the present invention;

FIG. 2 is a front elevational view of the energy attenuating seat illustrated in FIG. 1;

FIG. 3 is an enlarged side elevational view of one of the legs of the energy attenuating seat illustrated in FIGS. 1 and 2;

FIG. 4 is a sectional view of a portion of the leg illustrated in FIG. 3 taken on the line 4—4 thereof;

FIG. 5 is a view of a portion of the leg illustrated in FIG. 3 taken on the line 5—5 thereof.

FIG. 6A is a side elevational view of the seat illustrated in FIGS. 1 and 2 when it is being subjected to less than a predetermined forward load.

FIG. 6B is an illustration of the seat set forth in FIG. 6A when it is being deformed as a result of being subjected to more than a predetermined forward load; and FIG. 6C illustrates the seat set forth in FIG. 6B after it has been subjected to an increased forward load which results in buckling of a portion of the seat and the consequent lowering of the center of gravity of the seat.

DETAILED DESCRIPTION OF THE PREFERRED EMBODIMENT

Referring first to FIGS. 1 and 2, the energy attenuating aircraft type seat of the invention is illustrated and is designated generally by the number 10. The aircraft type seat 10 comprises a seat diaphragm 12, as illustrated in FIG. 2, which supports the substantially identical aircraft seat type bottom cushions 14 and a seat support structure generally designated by the number 16 which is connected to and supports the seat diaphragm 12. Three conventional seat backs 18 are also connected in a conventional manner to the rear portion of the seat support structure 16. Conventional substantially identical arm rests 20 are located between the lower portions of the seat backs 18 and at one end of the seat back 18 and are pivotally connected in a conventional manner to the seat support structure 16. An end bay 22 is located at the end of the seat support structure 16 which does not have an armrest 20 and this end bay 22 also serves as an armrest.

The seat support structure 16 comprises two substantially identical hollow tubular members 24 and 26 which are located generally horizontally with respect to the floor 28 of the vehicle such as an aircraft. These tubular members 24 and 26 are maintained a fixed distance apart by substantially identical beam members, such as the beam member 30 illustrated in FIG. 1. The seat support structure 16 also comprises two substantially identical rear seat leg members 32 which have their upper portions connected to the rear tubular member 26 and extend downwardly at an angle from the tubular member 26. The lower end portions of the respective leg members 32 are connected to the respective rearward portions of channel bracing members 34. The seat support structure 16 also comprises two spaced apart substantially identical front leg members 36 which have their upper portions connected to the front tubular member 24 and extend downwardly in a generally vertical direction from the tubular member 24. The lower end portions of the front leg members 36 are connected to the respective forward portions of the channel bracing members 34. The seat support structure 16 also has diagonal bracing members 38 which have their respective ends connected to the lower portion of the rear leg member 32 and the upper portion of the front leg member 36. A conventional baggage restraining bar 40 passes through the lower apertures 42 in the front leg members 36 and the outer portion of the retaining bar 40 bends around under the end bay 22 and has an upward extending portion 43 whose upper end is connected to one of the ends of the hollow tubular member 26.

FIGS. 3, 4 and 5 illustrate the details of the structure of each of the leg members 36. Each leg member 36 comprises two elongated flange portions 44 and 46 which are connected at their lower end portions by the lower end portion 48 of the leg member 36 and at their upper end portions by the upper end portion 50 of the leg member 36. The elongated flange portions 44 and 46 are spaced apart to create an opening or gap G between them. These elongated flange members 44 and 46 diverge slightly as they extend in an upward direction so that the gap G increases with the distance from the lower end portion 48.

Also, as illustrated in FIG. 2 the two elongated flange portions 44 and 46 have substantially the same thickness and they lie in substantially the same plane. The elongated flange portions 44 and 46 each have substantially the same cross section illustrated in FIG. 4 and it will be noted that each flange portion 44 and 46 has an elongated central rib 52 to give it strength and tend to prevent the leg member 36 from being bent in a forward or aft direction when the leg member 36 is attached to the tubular member 26.

As illustrated in FIG. 3, the upper end portion 50 of the leg member 36 has a large slot or opening 54 in its upper end which is sized and shaped to receive a portion of the tubular member 24. The lower end portion 48 of the leg member 36 also has a slot or opening 56 which is sized and shaped to receive a portion of the forward portion of a channel bracing member 34. A hole 58 is also provided in the lower end portion 48 of the leg member 36 for use in attaching the leg member 36 to the forward portion of the channel bracing member 34 in a conventional manner. The lower end portion 48 also has the generally rectangular shaped aperture 42 extending through it through which a portion of the restraining bar 40 passes. In addition, a protrusion 60 is provided on the inner surface of the upper end portion 50 and this protrusion has a hole 64 which is used to connect the upper end portion 50 of the leg member 36 to the forward upper portion of one of the bracing members 38.

As best illustrated in FIG. 3, two vertically spaced apart protrusions or spacers 66 and 68 extend or project forward from the rib 52 of the rearward flange portion 44 and toward the rib 52 of the forward flange portion 46. It will be noted that there is a gap or substantially uniform space or distance $G_2$ between the outer ends 70 and 72 of the respective spacers 66 and 68 and the adjacently located outer surface of the rib 52 of the forward flange portion 46. Both of the gaps $G_2$ are substantially identical and in the preferred embodiment these gaps are between about 0.020 to about 0.080 inches.

FIG. 5 illustrates the outer surface 74 of the outer ends 70 or 72 which are substantially identical and consequently only the outer surface for the outer end 70 is shown in FIG. 5. It will be noted that the thickness $T_2$ of the outer surface 74 is substantially uniform throughout the width W of the outer surface 74 and the thickness $T_2$ of the outer surface 74 is substantially equal to the thickness T of the ribs 52 of forward and aft flange portions 46 and 44. Also, in the preferred embodiment, the width W of the outer surface 74 is about three to about four times the thickness $T_2$ of the outer surface 74. In the preferred embodiment, the thickness T and $T_2$ is between about 0.09 inch and about 0.13 inch. It will of course be appreciated that more than the two spacers 66 and 68 might be utilized in appropriate circumstances, but the areas of the spacers should then be substantially equivalent to the areas of the outer ends 70 and 72 of the respective spacers 66 and 68.

The energy attenuating seat 10 and its associated seat leg members 36 are made and used as follows. The front seat leg members 36 may be manufactured as a conventional front seat leg member by forging in a manner well known in the art so that there is no gap $G_2$ in the spacers 66 and 68. In this case the gaps $G_2$ would then be machined in a conventional manner into the spacers 66 and 68. Alternatively, under suitable circumstances, the leg members 36 might be cast with the gaps $G_2$ in them. In addition, the other components of the energy attenuating seat 10 are manufactured in a conventional manner which is well known in the art.

These leg members 36 are then assembled in a conventional manner as part of the seat support structure 16 of the aircraft seat 10 by suitably attaching, in a conventional manner, the upper portions 50 of the forward leg members 36 to the tubular member 24 and by suitably attaching the lower portions 48 of the leg members 36 to the forward portions of the respective channel bracing members 34. The remainder of the energy attenuating seat 10 is also assembled in a conventional manner which is well known in the art.

As best illustrated in FIGS. 1 and 6A, the assembled energy attenuating seat 10 is then located on the floor 28 of a vehicle such as an aircraft and secured in place in a conventional manner through means known in the art which are not shown. The center of gravity C.G. of the installed energy attenuating seat 10 is illustrated in its conventional location in FIG. 6A and this center of gravity C.G. continues to remain in place even though the seat 10 is subjected to conventional forward forces represented by the arrow F. The conventional forces might be the result of the vehicle stopping, etc. FIG. 6B illustrated the energy attenuating seat 10 when it is being subjected to continuing higher forward loads or forces F than the forward forces applied to the seat in FIG. 6A. As illustrated in FIG. 6B, when the forward forces reach a predetermined value, the elongated flange portions 44 and 46 of the leg members 36 actually elastically bend or bow forward. This elastic deformation can continue with a corresponding increase in the magnitude of the forward load or forces F and eventually the outer ends 70 and 72 of the respective spacers 66 and 68 come into contact with the adjacent surface of the elongated flange portion 46 so that a portion of the flange 44 exerts a force upon the other adjacent flange portion through the spacers 66 and 68.

When this occurs the resistance of the leg member 36 to bending actually increases and this also increases the loads which can be applied to the leg 36 during elastic deformation of the leg 36. Initially, of course, the gaps $G_2$ prevent a portion of the flange portion 44 from exerting a force upon the other flange 46 during the initial elastic deformation of the leg 36. However, after the outer ends 70 and 72 of the spacers 66 and 68 contact the inner surface of the flange portion 46 and after applying continuing increasing forces F a point or forward load will be reached where plastic deformation of the leg 36 begins to occur.

FIG. 6C illustrates what happens to the energy attenuating seat 10 and its seat leg members 36 as forward loads F are continued to be applied after plastic deformation begins to occur. It will be noted that the leg members 36 have completely collapsed downward toward the floor 28 of the vehicle. In this connection, the flange portion 46 of the seat leg member 36 is bent substantially into a "U" shape and that the other flange portion 44 has been fractured or broken into two parts. It will be noted that the diagonal bracing member 38 and the rear leg members 32 have pivoted forward and downward as a result of the forward loads or forces F. As a result of the collapsing to the forward leg members 36 and the pivoting of the bracing members 38 and the rear leg members 32, the center of gravity C.G. of the energy attenuating seat 10 is lowered by a significant distance. It will of course be understood that the baggage restraining bar 40 has been omitted from FIGS. 6A, 6B, and 6C only for clarity.

The construction of the seat leg member 36 and the associated energy attenuating seat 10 are important as indicated in connection with the functioning of the seat 10 illustrated in FIGS. 6A, 6B and 6C. Due to this construction, the legs 36 absorb some of the initial energy as a result of the forward loads F by elastic deformation, then the ability to withstand higher loading is increased when the outer surfaces 70 and 72 of the spacers 66 and 68 contact the inner surface of the flange portion 46. Then additional energy is absorbed by the leg members as they collapse plastically as illustrated in FIG. 6C. This in itself helps the seat 10 and its occupant(s) withstand any peak loads or shocks experienced as a result of unusual forward loads F such as would occur during an accident or a crash. In addition since the center of gravity C.G. of the energy attenuating seat 10 is lowered, this results in less torque or forces being applied to the attaching mechanisms (not shown) which hold the seat 10 to the vehicle floor 28 and consequently this reduces or eliminates the possibility that the seat will become unsecured or detached from the floor 28 which could be extremely dangerous to both the seat occupants and others in the vehicle.

Although the invention has been described in considerable detail with reference to a preferred embodiment, it will be understood and appreciated that variations may be made within the spirit and scope of the invention as defined in the appended claims.

What is claimed is:

1. A leg for a seat comprising two elongated spaced apart flange portions which are connected together at their respective ends which form a gap or space between at least a portion of the flange portions and means connected to at least one of said flange portions for increasing the loads which can be applied to said leg during elastic deformation of said leg, said means for increasing loads which can be applied comprising means for a portion of one flange portion located on one side of the gap or space to exert a force upon the other adjacent flange portion located on the other side of the gap or space.

2. The leg of claim 1 wherein said means for increasing the loads which can be applied to said leg during elastic deformation of said leg includes means for preventing a portion of one flange portion located on one side of the gap or space from exerting a force upon the other adjacent flange portion located on the other side of the gap or space during initial elastic deformation of said leg.

3. The leg of claim 1 wherein said means for preventing a portion of one flange portion located one one side of the gap or space from exerting a force upon the other adjacent flange portion located on the other side of the gap or space during initial elastic deformation of said leg comprises a spacer portion connected to one of said flange portions and a gap between the spacer portion and said other flange portion.

4. The leg of claim 3 wherein said spacer portion comprises a protrusion projecting from one of said flange portions.

5. The leg of claim 4 wherein said leg has a forward flange portion and a rearward flange portion and the gap between said protrusion and said other flange portion is located adjacent said forward flange portion.

6. The leg of claim 5 wherein said leg has a plurality of said protrusions and associated gaps.

7. The leg of claim 6 wherein the gaps associated with said protrusions are substantially identical.

8. The leg of claim 7 wherein the size of said gaps is between about 0.020 to about 0.080 inches.

9. The leg of claim 5 wherein each of said flange portions has an inner portion and each of said inner portions has an elongated central rib portion.

10. The leg of claim 9 wherein each of said flange portions lie in substantially the same plane.

11. The leg of claim 9 wherein each flange portion has substantially the same cross section.

12. The leg of claim 10 wherein the thickness of said protrusion is substantially uniform.

13. The leg of claim 12 wherein the thickness of said protrusion is substantially equal to the thickness of the rib portions of said flange portions.

14. The leg of claim 13 wherein the thickness of said protrusion is between about 0.09 of an inch and about 0.13 of an inch.

15. The leg of claim 13 wherein the width of said protrusion is about three to about four times the thickness of said protrusion.

* * * * *